United States Patent [19]
Sato

[11] Patent Number: 6,059,232
[45] Date of Patent: May 9, 2000

[54] SEPARABLE CORD CONNECTING STRUCTURE OF PARACHUTE

[75] Inventor: Hiromichi Sato, Tokyo, Japan

[73] Assignee: Fujikura Parachute Company, Ltd., Tokyo, Japan

[21] Appl. No.: 09/289,250

[22] Filed: Apr. 9, 1999

[30] Foreign Application Priority Data

Apr. 20, 1998 [JP] Japan ................................. 10-125220

[51] Int. Cl.⁷ .................................................. B64D 17/60
[52] U.S. Cl. ............................................................ 244/149
[58] Field of Search .................................. 244/142, 147, 244/148, 149, 151 R, 151 B

[56] References Cited

U.S. PATENT DOCUMENTS

| | | | |
|---|---|---|---|
| 2,981,505 | 4/1961 | Oakley | 244/149 |
| 4,637,577 | 1/1987 | Miseyko et al. | 244/149 |
| 5,232,184 | 8/1993 | Reuter | 244/149 |
| 5,253,826 | 10/1993 | Coltman et al. | 244/149 |

FOREIGN PATENT DOCUMENTS

| | | | |
|---|---|---|---|
| 837237 | 6/1960 | United Kingdom | 244/149 |

*Primary Examiner*—Galen L. Barefoot
*Attorney, Agent, or Firm*—Koda & Androlia

[57] ABSTRACT

A separable cord connection structure of a parachute, wherein it has a separable cord 11 for being anchored to the airplane via or not via a static cord, a main cord 13 unreleasably fastened to the canopy top of the parachute, and a deployment bag 5 for packing said parachute, and said separable cord 11 has two loops of separable cords 112,113 formed to face each other, and on the other hand, two intersecting coupling loops 141, 142 are formed across one upper end to the other upper end fastened thereto on the side of the separable cord of said deployment bag, characterized in that a rigid pin 12 passes through the loops of the two separable cords, further, passing through the loops formed by the intersection of said coupling loops, further, passing through a metallic guide in the separable cords, and one end part is temporarily fastened to the separable cords, the other end part is connected to the main cord, and said main cord has a branch 131, and said branch is fastened to the pack.

Since said coupling loop and separable cord loops are arranged in order so as to be separated from each other by using a rigid pin and a metallic guide, this structure has such an advantage as said coupling loop and separable cord loops and main cord are not in danger of getting entangled.

6 Claims, 4 Drawing Sheets

SEPARABLE CORD CONNECTING STRUCTURE OF PARACHUTE

BACKGROUND OF THE INVENTION

1. Field of the Invention

The present invention relates to a separable cord connecting structure of a parachute, and more particularly a connecting structure to automatically deploy the parachute and also smoothly separate a separable cords which remain on the side of an airplane, when a human being parachutes or an object, etc. is para-dropped from the airplane.

2. Related Art

As shown in FIG. 3, when parachuting an object or a human being from an airplane, the static line 3 is arranged so as to pull a canopy 21 of a parachute 2 out of a deployment bag 5 by connecting one end of said static line 3 fastened to the canopy 21 of the parachute 2 to the airplane A and para-dropping said object 4 connected to the parachute 2. The static line 3 and the canopy 21 are temporarily fastened to each other by hand tack, and said hand tack is loosened by a force of the falling object 4 and the canopy is separated from the static line 3 (refer to FIG. 3 on the right). In such a tying structure, the deployment bag 5 and the static line 3 are left on the side of the airplane A and stored in the airplane A by pulling them up from inside of said airplane after the object 4 has been para-dropped.

As described above, the static line 3 and the deployment bag 5 are left on the side of the airplane A, however, if the deployment bag 5 is left on the side of the airplane, there is a deficiency that although it is wanted to pack the parachute after parachuting at a time of training, said deployment bag 5 is transported to the base of said airplane and so the parachute has to be transported into said base or the deployment bag 5 has to be transferred from said base to a place for packing the parachute. Moreover, when the object 4 is para-dropped from the side face of the airplane as shown in FIG. 3, it is possible to pack the deployment bag 5 and static line 3 in the airplane A and they do not hinder the airplane from landing, however, when the object is para-dropped from a predetermined part provided on the bottom part of the airplane A by opening a set of double doors opening outward, there has been a deficiency that it was impossible to pack said static line 3 and the deployment bag 5 and close the said double doors.

In order to eliminate the above deficiencies such an static line has been developed as it has a separable cord to be anchored to the airplane and a static line connected with this separable cord by hand tack to be releasable, and said static line is unreleasably fastened to a canopy of a parachute (refer to Japanese Patent Laid-Open 9-277993(277993/1997). Namely, as shown in FIG. 4, the separable cord 31 has two separable cord loops 312, 313 formed to be opposed to each other, and on the side of the separable cord of said deployment bag 5, two intersecting coupling loops 331, 332 are formed, and said static line 3 passes through the intersecting part of said coupling loops 331, 332 and also passes through the separable cord loops 312, 313 for being temporarily fastened to a hand tack 34, and further, a branch 321 is fastened to the deployment bag 5. Here, 311 is a connecting loop to be fastened to the side of the airplane.

With such a parachute, since the separable cords 31 and the static line 3 are temporarily fastened to each other by hand tack, said separable cords and the static line are separated from each other after the canopy is pulled out of the deployment bag by said static line in a case of para-dropping the object. Thus, the static line 3 and the deployment bag 5 fastened to the static line by the branch are para-dropped with the jumper or the object and only the separable cord is left on the airplane.

However, an static line structure as described above has such a complex structure as the static line 3 passes through the separable cord loops 312, 313, then passing through the intersecting part of the coupling loops 331, 332, and being fastened to the separable cord 31 by the hand tack 34, therefore, there is a fear of getting entangled, being not quickly released or being not released.

SUMMARY OF THE INVENTION

An object of the invention is to provide a connection structure of a separable cord with a quicker releasability and a higher safety by arranging a structural part of said complexly formed separable cord in order.

A separable cord connection structure of a parachute in accordance with the present invention is characterized in that It has a separable cord for being anchored to the airplane via or not via a static line, main cord unreleasably fastened to the canopy top of the parachute, and a deployment bag for packing said parachute, and said separable cord has two loops of separable cords formed to face each other, and on the other hand, in the separable cord connection structure of the parachute in which two intersecting coupling loops fixed from one upper end to the other upper end are formed on the side of the separable cord of said deployment bag, a rigid pin passes through the loops of the two separable cords, further, passing through the loops formed by the intersection of said coupling loops, further passing through a metallic guide in the separable cords, and one end part is temporarily bound to the separable cords, the other end part is connected to the main cord, and said main cord has a branch, and said branch is fastened to the deployment bag.

According to the present invention, said coupling loop and separable loops are arranged so as to be separated from each other by using the rigid pin, therefore, it is advantageous that said coupling loop and separable cord loops are not in danger of getting entangled.

DETAILED DESCRIPTION OF THE INVENTION

Figure 1:
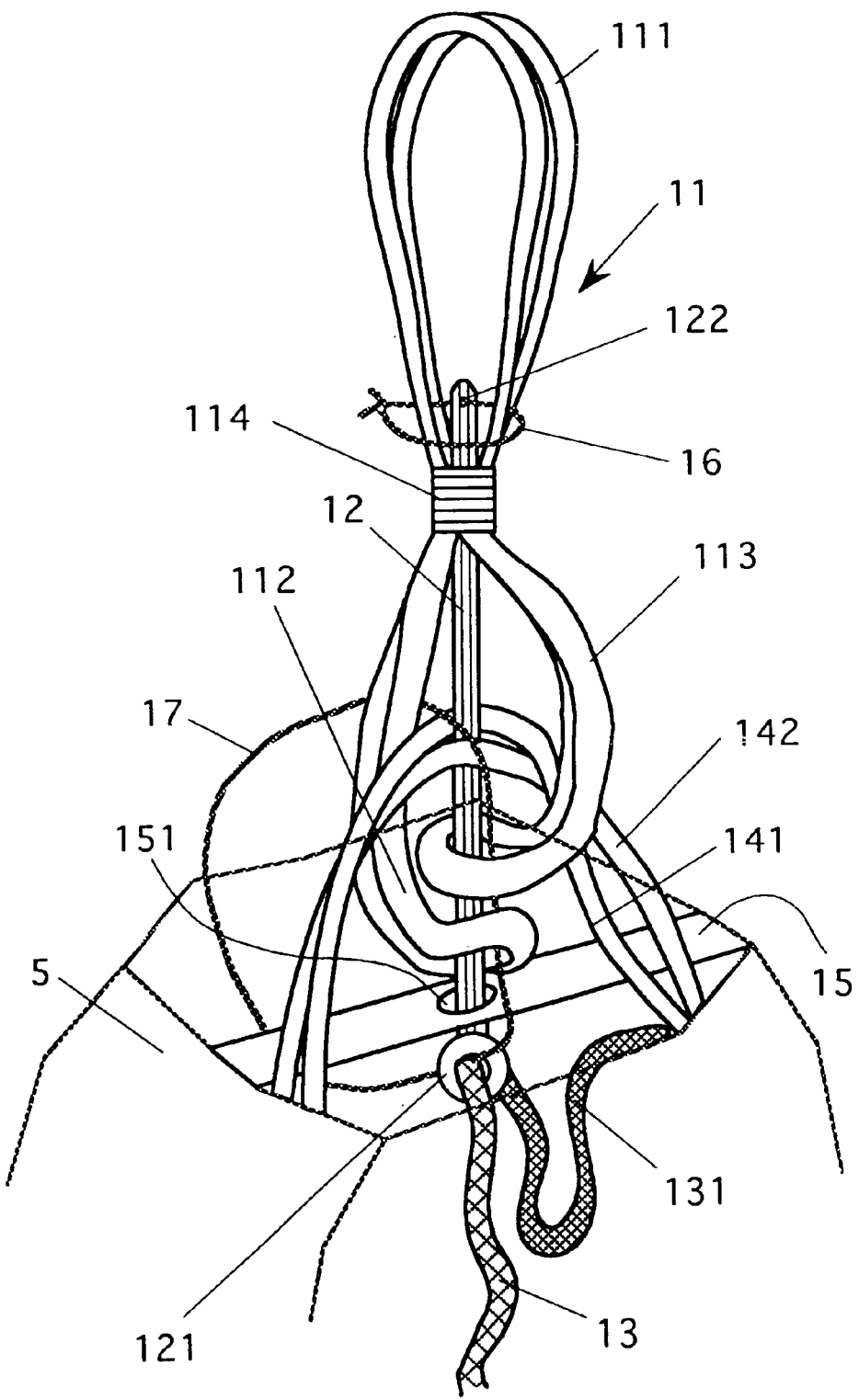
FIG. 1 is a perspective view of the separable cord connection structure of the parachute in accordance with the present invention.
Figure 2:
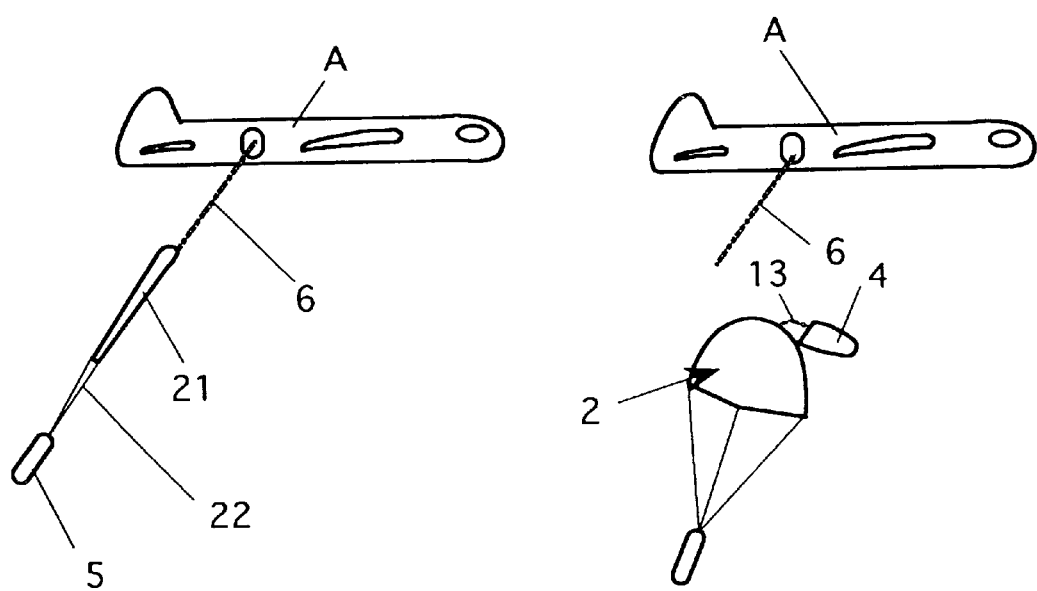
FIG. 2 is a drawing explaining function of separable cord connecting structure for the parachute in accordance with the present invention.

The separable cord connecting structure of a parachute in accordance with the present invention will be explained referring to the drawings. As being apparent from FIG. 1, the separable cord 11 has connecting loops 111 for connecting to an airplane A via or not via a static line 6 and two loops of separable cords 112, 113 for passing through a rigid pin 12. These two connecting loops 111 and two separable cord loops 112, 113 are formed by a metallic guide 114.

On the other hand, a main cord 13 is packed with the parachute in a deployment bag 5 of a bag shape so as not to be entangled, and said main cord 13 is fastened to a ring 121 formed at one end part of said pin 12. Further, the main cord 13 has a branch 131 and this branch 131 is fastened to the deployment bag 5.

Coupling loops 141, 142 are provided in a form of an arch from one upper end of said deployment bag 5 on the side of the separable cord to the other upper end, and further similarly, a pin hooking tape 15 is bridged from one upper end to the other upper end. The pin hooking tape 15 is provided with a through hole 151 for passing the pin therethrough. The pin 12 passes through said through hole 151 and further the loop formed by the intersecting part of said coupling loops 141, 142 intersecting each other, then passing through the loops of the two separable cords 112, 113 and the metallic guide 114, and then being fastened to the connecting loop 111 of the separable cord 11 with a hand tack 16 which can be cut off.

Said pin 12 is provided with a through hole 122, and the hand tack 16 passes through this through hole 122 and is firmly bound to said connecting loop 111.

According to the present invention, a hand tack 17 is provided so that it passes through a ring 121 of said pin 12 and the separable cord loops 112, 113, and then returns to said ring 121 via the upper part of the coupling loops 141, 142. By providing such a hand tack 17, it is possible to hand tack the coupling loops 141, 142, the separable cord loops 112, 113, the pin 12, and the pin hooking tape 15 in one piece. Thus, it can be prevented that the above-mentioned parts are entangled, not quickly separated, or not separated from each other.

When an object is para-dropped from an airplane A, for example, he connecting loops 111 of said separable cord 11 or a static line 6 fastened to this connecting loop is coupled to a predetermined part of the storage part on the airplane A. When the storage part is opened and the object 4 is released in such a state, the object falls. When said static line 6 is loaded with a tension, this kind of parachute has such a structure as suspension line 22 of the parachute 2 in the deployment bag 5 are extended and the parachute 2 can be pulled out of the deployment bag 5. Namely, the tension is not loaded between said separable cord and the coupling cord before the parachute 2 is released from the deployment bag 5 as described above. However, when said parachute 2 is released, a main cord 13 is also extended, which is folded and stored in the deployment bag 5.

In such a state as described above, the main cord 13 itself is loaded with the weight of said object 4, therefore, the pin 12 connected with the main cord 13 is loaded with the tension, and as a result, the hand tack 16, which is temporarily fastening the pin 12 to the separable cord 11, and the hand tack 17, which is temporarily fastening in one piece the coupling loops 141, 142, the separable cord loops 112, 113, the pin 12, and the pin hooking tape 15, are cut off.

Thus, the pin 12 is drawn out of the through hole 151 of the pin hooking tape 15 and the separable cord loops 112, 113, and is also drawn out of the loop formed by the intersection of the coupling loops 131, 132. As a result, said separable cord loops 112, 113 and coupling loops 131, 132 are also released from their restraint, and the separate cord 11 and the main cord 13 are separated from each other. At the same time, the deployment bag 5 is also released from the separable cord 11.

Figure 3:
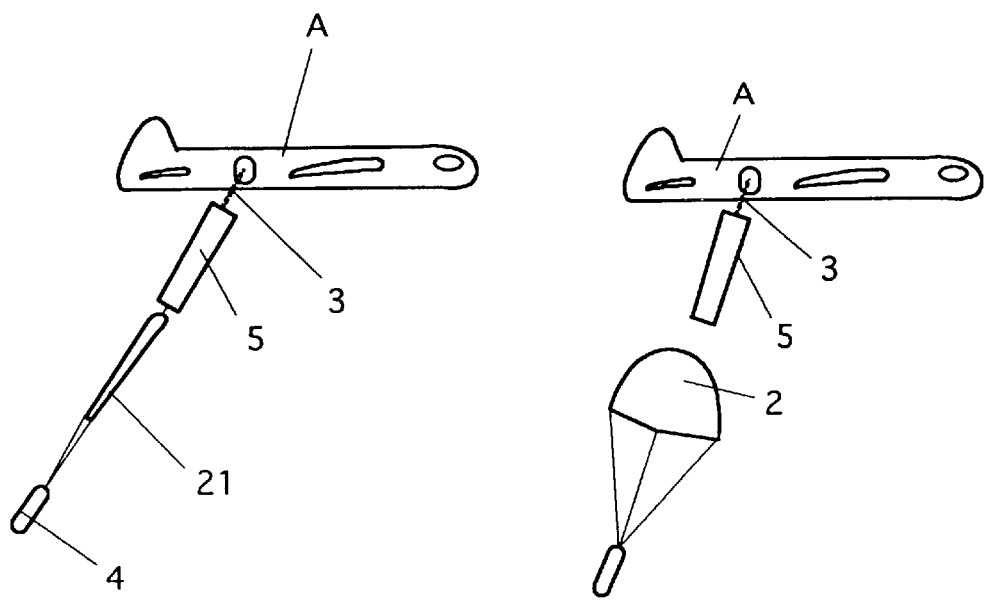
FIG. 3 is a drawing explaining function of a separable cord connecting structure of a conventional parachute.
Figure 4:
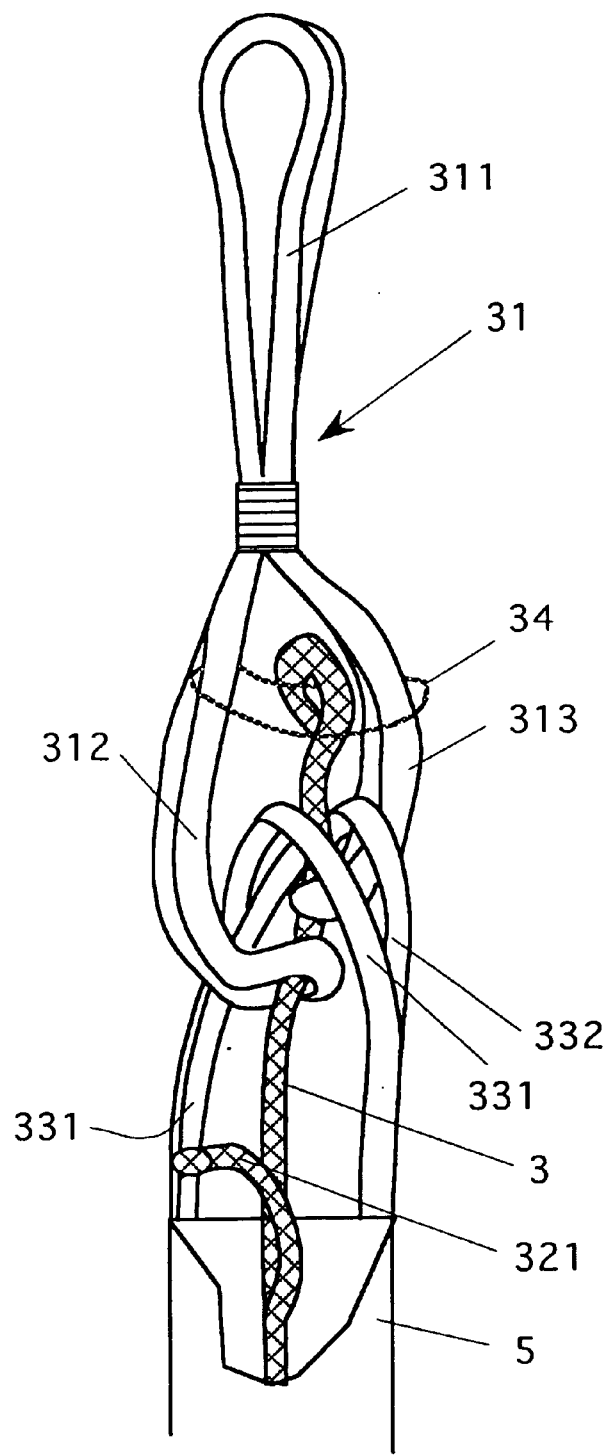
FIG. 4 is a perspective view of a separable cord connection structure of a conventional parachute.

Further, since said deployment bag 5 is fastened to the main cord 13 by the branch 131 of the main cord 13, the deployment bag is separated from the separable cord 11 with the main cord 13 and is dropped with the parachute 2 (refer to FIG. 3 right). The pin 12 has a rigidity in this case and is also guided by the through hole 151 of the pin hooking tape 15 and the metallic guide 114 in the separable cord, therefore, there are such advantages as a quick separation is possible and this improves safety and reliability.

According to the present invention, as described above, a complex structure, in which the separable cord loops and coupling loops are entangled with each other, is put in order by using the pin, and so separation from the separable cord becomes quicker and safety is also improved, therefore, there is an advantage that the present invention can be applied not only to an object but also to parachuting of a human being.

Moreover, when separable cord is not connected with the static line (in this case, the static cord is a lengthy one and (corresponds to the main cord shown in FIG. 3), only the separable cord remains in the storage part on the airplane A, therefore, it becomes possible for the airplane to fly immediately after releasing or parachuting with the door of said storage part closed after para-dropping the object 4. Thus, it become possible to drop an object from a storage part on the bottom of the airplane, and the deployment bag and long coupling cord are also left with the parachute, therefore, there is such an advantage as the parachute can be pack immediately after parachuting.

In the preferred embodiment described above, the deployment bag can be an inner bag, a sleeve, and in a case of the inner bag, the separable cord can also be provided on the top of the inner bag.

As explained above, according to the separable cord connecting structure of the parachute in accordance with the present invention, two loops of separable cords to be connected to the airplane via or not via the static cord and the pin passing through the loops formed by two intersecting coupling loops are provided, and one end of the pin is hand tacked to the separable cord by a hand tack and the other end is tacked to the main cord, and further, said main cord has a branch and the branch is fastened to the deployment bag, therefore, when said pin is loaded with a tension, it can smoothly be drawn out and cuts off the hand tack. The arrangement makes it possible to quickly deploy the parachute and improves safety and reliability. Further, since the deployment bag is fastened to the main cord and dropped with the parachute, it is also advantageous to be able to pack the parachute immediately after parachuting.

What is claimed is:

1. A separable cord connection structure of a parachute, wherein the structure has a separable cord for being anchored to an airplane via or not via a static cord, a main cord unreleasably fastened to the canopy top of the parachute, and a deployment bag for packing the parachute, and said separable cord has two loops of separable cords formed to face each other, and on the other hand, two intersecting connecting loops are formed across one upper end and the other upper end fastened thereto on the side of said separable cord of said deployment bag, and wherein a rigid pin passes through the loops of the two separable cords, further, passing through the loops formed by the intersection of said coupling loops, and one end part is temporarily fastened to the separable cords by hand tack and the other end part is connected to the main cord, and further said main cord has a branch, and said branch is fastened to the pack.

2. A separable cord connection structure of a parachute according to claim 1, wherein said pin has a ring for coupling to said main cord at an end part hand tacked to the separable cord by hand tack of said pin.

3. A separable cord connection structure of a parachute according to claim 2, wherein the hand tack is provided so that it passes through the ring coupled to the coupling cord of said pin and two loops of the separable cords and further returns to said ring through the upper part of said coupling loops.

4. A separable cord connection structure of a parachute according to claim 1, wherein said separable cord has a metallic guide so that said pin is properly fastened when the pin is connected with the separable cord, and it is smoothly drawn out when it is released.

5. A separable cord connection structure of a parachute according to claim 1, wherein a pin hooking tape is provided on the top end of the deployment bag for said pin, and a hole is formed on said pin hooking tape for passing the pin therethrough.

6. A separable cord connection structure of a parachute according to claim 1, wherein a through hole is provided at one end part of said pin and said hand tack is fastened to the connecting loop through said through hole.

* * * * *